US007084416B2

(12) United States Patent
Suzuki

(10) Patent No.: US 7,084,416 B2
(45) Date of Patent: Aug. 1, 2006

(54) BANKNOTE VALIDATING APPARATUS AND METHOD

(75) Inventor: Daishi Suzuki, Iwatsuki (JP)

(73) Assignee: Asahi Seiko Kabushiki Kaisha, Tokyo (JP)

( * ) Notice: Subject to any disclaimer, the term of this patent is extended or adjusted under 35 U.S.C. 154(b) by 219 days.

(21) Appl. No.: 10/881,219

(22) Filed: Jun. 29, 2004

(65) Prior Publication Data

US 2005/0029075 A1 Feb. 10, 2005

(30) Foreign Application Priority Data

Jun. 30, 2003 (JP) ............................ 2003-186197

(51) Int. Cl.
*G06K 7/00* (2006.01)
*G01N 21/86* (2006.01)

(52) U.S. Cl. .................. 250/556; 250/559.38; 194/207

(58) Field of Classification Search ................ 250/556, 250/214 R, 222.1, 559.38, 341.1; 209/534; 194/207, 302; 356/71; 382/135
See application file for complete search history.

(56) References Cited

U.S. PATENT DOCUMENTS 3,782,543 A 1/1974 Martelli et al. ............... 209/75
5,903,339 A 5/1999 Levasseur .................... 356/71
6,070,710 A * 6/2000 Hutchinson ................. 194/207

FOREIGN PATENT DOCUMENTS

JP 10-111967 4/1998

* cited by examiner

*Primary Examiner*—Kevin Pyo

(57) ABSTRACT

A banknote validator includes a first sensor unit, a second sensor unit, a correction parameter operating unit, and a distinguishing unit. The first sensor unit includes a first projecting section and a first receiving section for projecting and receiving a portion of a first light beam reflected off a received banknote generating a first receiving section signal. The second sensor unit has a second projecting section and a second receiving section for projecting a second light beam and receiving a portion of the second light beam reflected off the received banknote generating a second receiving section signal. The correction parameter operating unit receives the first receiving section signal and produces a correction parameter signal for the distance between the banknote and the second sensor unit. The distinguishing unit receives the second receiving section signal and the first correction parameter signal and determines the validity of the received banknote.

11 Claims, 5 Drawing Sheets

BANKNOTE VALIDATING APPARATUS AND METHOD

CROSS-REFERENCE TO RELATED APPLICATION

This application is based on application number 2003-186197 filed in Japan, dated Jun. 30, 2003.

FIELD OF THE INVENTION

This invention is related to a banknote validator and more particularly to a banknote validator including a correction for the movement of the banknote between oppositely placed optical sensors.

DESCRIPTION OF RELATED ART

Traditional banknote validators using reflecting optical sensors are known. The amount of light received by the reflecting optical sensor changes based on the distance between the banknote and optical sensor. A change to the amount of light can cause a misinterpretation of the signal from the optical sensor. To prevent movement of the banknote, an attempted solution to this problem has included using a banknote passageway guide for guiding the banknote to a predetermined position and restricting the movement of the banknote relative to the sensor as shown in the Japanese Laid-Open Patent Document 10-111967 (Especially FIGS. 2, 5, 7, and page 3).

In this case, the obverse and the reverse of the banknote are guided by projections in the banknote passageway so that the distance between the banknote and the optical sensor is kept relatively constant. However, a used banknote is often wrinkled and has a wavy surface. Accordingly, the amount of reflected light received by the optical sensor can vary depending on the orientation of the banknote surface at the reflecting point and possibly causing a genuine banknote to be falsely considered invalid.

SUMMARY OF THE INVENTION

The present invention, as defined in the claims, overcomes the deficiencies of the prior art by providing two optical sensor units and an evaluation of the distance between the banknote and a second reflecting sensor unit based on the output of the first reflecting sensor unit. In this description, the term banknote is a generic label that includes a banknote, a script, a bond, paper money, or any flexible media that may be transported and evaluated as described herein. The terms "projecting element" or "projecting section" are generic labels for a light emitting source that can emit infrared light, ultraviolet light or laser light from a laser source, for example.

The light emitting source can be an LED, a photon emitter, a light bulb, a lens for a light source, or a cover for a light, for example. Similarly, the terms "light receiving element" or "light receiving section" are generic names that include a receiving section for receiving light such as a photo diode, a photo transistor, a glass member, or an end face of an optical fiber, for example. Terms such as obverse, reverse, upper, and lower are used for illustrative purposes to describe the orientation of one element from another and are not considered limiting since the present invention may be practiced in various orientations.

In one embodiment, the present invention includes a first reflecting sensor unit, a second reflecting sensor unit, a first correction parameter operating unit, and a distinguishing unit. The first reflecting sensor unit is adjacent to a first side of a banknote passageway. The banknote passageway can receive a banknote. The first reflecting sensor unit includes a first light projecting section and a first light receiving section. The first light projecting section projects a first light beam while the first light receiving section receives a predetermined portion of the first light beam reflected from the received banknote. The first light receiving section outputs a first light receiving section signal.

The second reflecting sensor unit is adjacent to the first reflecting sensor unit and includes a second light projecting section and a second light receiving section. The second light projecting section projects a second light beam. The second light receiving section receives a predetermined portion of the second light beam reflected from the received banknote and produces a second light receiving section signal.

The first correction parameter operating unit receives the first light receiving section signal and generates a correction parameter signal based on the distance between the banknote and the second reflecting sensor unit. The distinguishing unit receives the second light receiving section signal and the first correction parameter signal and determines the validity of the received banknote. The second reflecting sensor unit can be located on a second side of the banknote passageway opposite from the first reflecting sensor unit.

In an embodiment, the present invention can include a second correction parameter operating unit and a comparator unit. The second correction parameter operating unit generates a correction parameter signal referring to a distance between the banknote and the second reflecting sensor unit. The comparator unit determines the validity of the banknote based on the second light receiving section signal and the second correction parameter signal.

In another embodiment, the first light projecting section is located on a first axis on the first side of the banknote passageway and the second light receiving section is located on the first axis on the second side of the banknote passageway opposite the first side, the first axis crossing the banknote passageway. The second light projecting section is located on a second axis on the second side of the banknote passageway and the first light receiving section is located on the second axis on the first side of the banknote passageway, the second axis crossing the banknote passageway and crossing with the first axis. A read controlling unit can control the reading of the first light receiving section signal and the second light receiving section signal so that these signals are read at mutually exclusive periods of time.

In an embodiment of the present invention, the validity of a banknote is flexibly determined based on a distance between the banknote and the reflecting optical sensor. Stated differently, the output of the second reflecting sensor is corrected or adjusted to a level corresponding to the signal when the banknote is at a standard position by the correction parameter. Then, the distinguishing unit determines the authenticity of the received banknote by comparing the adjusted signal to a stored range of acceptable values. So, if the banknote is wrinkled or has a wavy surface causing the sample region adjacent to the sensor to be either farther away or closer to the sensor, the received light amount is corrected to an amount at a standard position and the corrected amount is compared to the standard amount. In this way, a banknote may be deemed as valid or invalid whether or not the banknote is wrinkled or has a wavy surface.

In an embodiment of the present invention, a method of determining the validity of a received banknote includes emitting a first light beam from a first light projection section, reflecting the first light beam by the received banknote, producing a first light receiving section signal, capturing a first side sample of the first light receiving section signal, emitting a second light beam from a second projection section, reflecting a portion of the second light beam by the received banknote, producing a second light receiving section signal, capturing a second side sample of the second light receiving section signal, evaluating the first side sample in comparison with a history of first side samples to produce a first correction value, evaluating the second side sample and the first correction value to produce a second correction value, evaluating the second side sample and the second correction value to produce a correction detecting value, and comparing the correction detecting value with a history of correction detecting values to produce a validity decision.

The method can further include summing up a plurality of validity decisions computed for plurality of locations on the received banknote to determine a majority validity decision regarding the validity of the received banknote.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the intention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
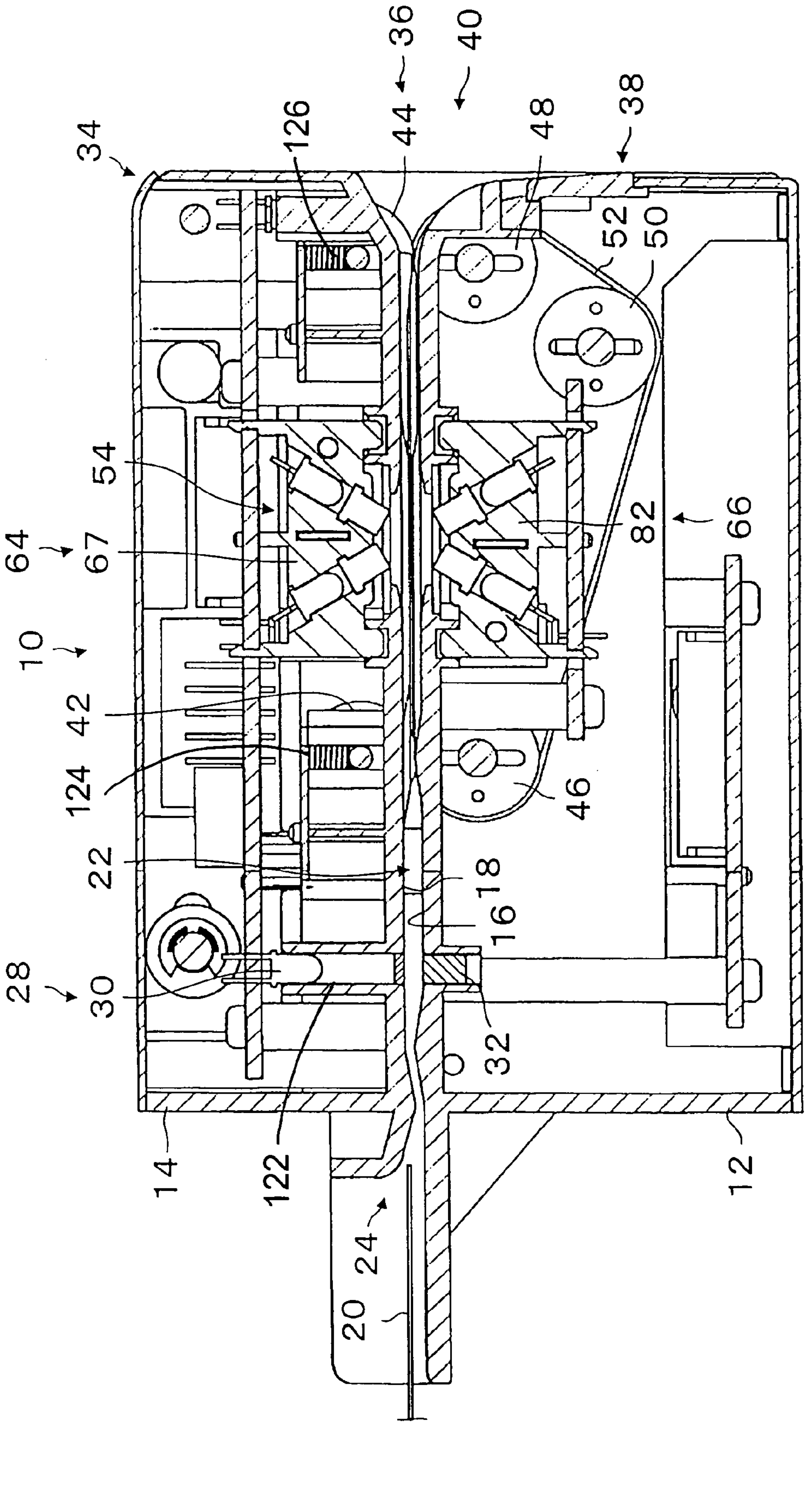
FIG. 1 is a cross section view of banknote detecting apparatus in accordance with an embodiment of the present invention.

In reference to FIG. 1, a banknote detecting apparatus 10 that optically detects the pattern data of a banknote 20 is explained. The banknote detecting apparatus 10 includes a lower housing 12 and an upper housing 14. The upper surface of the lower housing 12 includes a substantially planar lower guiding surface 16 and is enclosed on each side by left and right guiding boards. The space between the left and the right guiding boards is slightly larger than the maximum width of the received banknote, and the lower section of upper housing 14 fits into this space.

The lower surface of upper housing 14 includes a substantially planar upper guiding surface 18. The lower guiding surface 16 and the upper guiding surface 18 are substantially parallel to each other and displaced from each other by a small amount in order to define a space with a predetermined height that can pass the banknote 20 along a channel that is denoted as a banknote passageway 22. The banknote 20 enters the banknote passageway 22 from a banknote slot 24 and passes along the banknote passageway 22 in a left-to-right manner, defining a forward processing direction, as shown in FIG. 1.

A starting sensor 28 is located along the banknote passageway 22 in the forward processing direction and provides a detection of a banknote 20 inserted through the banknote slot 24 and into the banknote passageway 22. The starting sensor 28 includes a projecting and receiving photo element 30 that is located at the bottom (upper section) of a starting keeping hole 122 in the upper housing 14. A reflecting member 32 is located in the lower housing 12 and faces toward the projecting and receiving element 30. Projected light from the projecting and receiving element 30 crosses the banknote passageway 22 and is reflected by the reflecting member 32.

The reflected light then re-crosses the banknote passageway 22 and illuminates the light receiving section of the projecting and receiving element 30. When the received banknote 20 cuts off the light to the starting sensor 28, the receiving portion of the projecting and receiving element 30 does not receive as much light. Some portion of the projected light is reflected off the surface of the received banknote 20, but the received portion is much less than when the projected light is reflected by the reflecting member 32. Hence, the presence of a banknote 20 is detected by the starting sensor 28, and a transporting unit 34 is activated to draw the received banknote 20 into the banknote passageway 22 between the upper housing 14 and the lower housing 12.

The transporting unit 34 is located downstream from the starting sensor 28 along the banknote passageway 22 in the forward processing direction. The transporting unit 34 includes a plurality of transporters 40 formed with an upper transporter 36 and a lower transporter 38. The transporters 40 are located in parallel along the width direction of the banknote passageway 22. However when the banknote 20 travels in a straight line, only one transporter 40 may be needed. The upper transporter 36 includes pulleys 42 and 44 that are rotatably mounted at the upper housing 14. The lower transporter 38 includes pulleys 46, 48, 50 that are rotatably mounted at the lower housing 12. Belt 52 is positioned around the pulleys (46, 48, 50) of the lower housing 12.

The pulleys 42 and 44 are urged by springs (124, 126) to face the lower housing 12 having contact with the lower belt 52 at their corresponding pulleys (46, 48) in the lower housing 12. The pulley 50 is connected to the output shaft of a driving motor (not shown) that is activated in either the forward or reverse direction in order to advance a received banknote 20 in the forward or reverse processing direction as described. When the banknote 20 is received, the pulley 50 is rotated in the clockwise direction shown in FIG. 1. The banknote 20 is held by an outer surface of the lower belt 52, and between pulleys 42 and/or 44, and is transported to the right in banknote passageway 22, as shown in FIG. 1.

When the banknote 20 is returned toward the banknote slot 24, the transporting unit motor is activated in the reverse direction causing the pulley 50 to rotate in the counter clockwise direction, so that the banknote 20 is transported to the right-to-left direction along the banknote passageway 22, as shown in FIG. 1. In this case the transporting unit 34 motor is activated in the reverse processing direction.

A banknote detecting apparatus 54 is located near the middle of the banknote passageway 22 and includes a first reflecting sensor unit 58 and a second reflecting sensor unit 62. The first reflecting sensor unit 58 includes a first light emitting element 70, a first projecting guard element 72, a first receiving guard element 80, and a first light receiving element 78. First light receiving element 78 can be a phototransistor, a Cadmium Sulfide (CdS) cell, or a light sensitive transducer that produces a signal that can vary based on the intensity of the received light.

The first light emitting guard element 72 is positioned adjacent to the first light emitting element 70 and includes a first light emitting guard cover 74 that is the light emitting face of the light emitting guard element 72. The first light receiving guard element 80 is positioned adjacent to the first light receiving element 78 and includes a first light receiving guard cover 81 that is the light receiving face of the first light receiving guard element 80. An upper sensor unit 64 is supported by the upper housing 14 and includes the first reflecting sensor unit 58 mounted within a first sensor body 67, as shown in FIG. 1.

The second reflecting sensor unit 62 includes a second light emitting element 84, a second light emitting guard element 86, a second light receiving guard element 90, and a second light receiving element 88. The second light emitting guard element 86 is positioned adjacent to the second light emitting element 84 and includes a second light emitting guard cover 87 that is the light emitting face of the second light emitting guard element 86. The second light emitting element 84 can be an infrared emitting (IR) diode.

The second light receiving guard element 90 is positioned adjacent to the second light receiving element 88 and includes a second light receiving guard cover 91 that is the light receiving face of the second light receiving guard element 90. A lower sensor unit 66 includes the second reflecting sensor unit 62 mounted within a second sensor body 82, as shown in FIG. 1. The lower sensor unit 66 is supported by the lower housing 12. The upper sensor unit 64 and the lower sensor unit 66 are mounted symmetrically with respect to each other on opposite sides of the banknote passageway 22.

Figure 2:
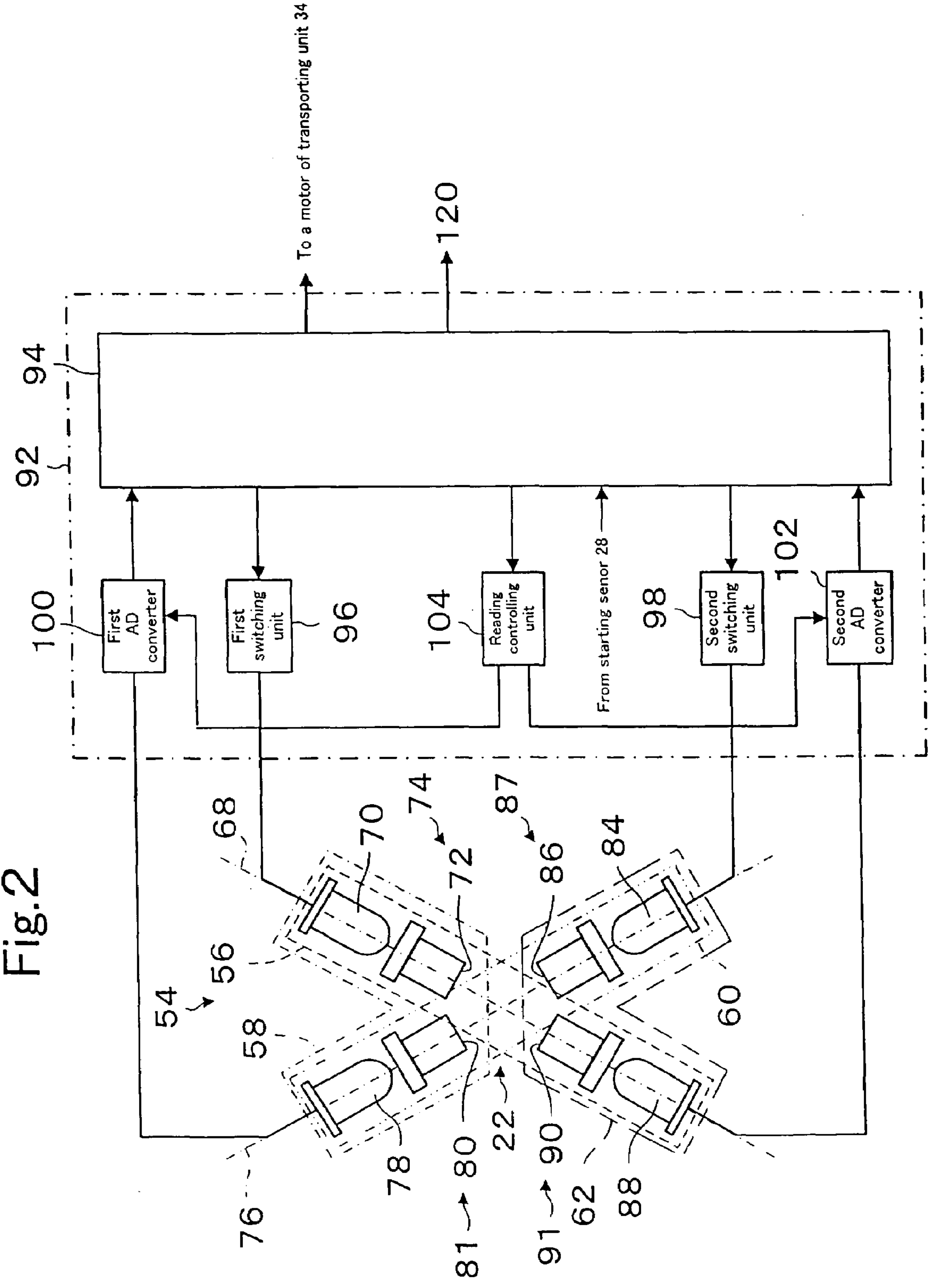
FIG. 2 is a block diagram showing the connection with and orientation of the reflecting sensor units in accordance with an embodiment of the present invention.

A first aligned sensor pair 56 includes the first light emitting element 70 and the second light receiving element 88. A second aligned sensor pair 60 includes the second light emitting element 84 and the first light receiving element 78, as shown in FIG. 2. The first light emitting element 70 is supported by the first sensor body 67 and is located on a first axis 68 that crosses the banknote passageway 22 at an obtuse angle relative to the banknote slot 24.

The first light emitting element 70 can be a light emitting diode (LED), infra-red (IR) diode, or other light emitting device for emitting a light beam that may be received by the first light receiving element 78 and the second light receiving element 88. The first light emitting guard cover 74 can include a transparent material such as an acrylic resin, optical fiber, or glass. The first light emitting guard cover 72 is cylindrical in shape and can be located in front of first emitting element 70.

Similarly, the second aligned sensor pair 60 includes the first light receiving element 78 is located on second axis 76 which cross the first axis 68 at a predetermined angle to form an "X" at a midpoint of the banknote passageway 22. Alternatively, the first light emitting guard element 72, the first light receiving guard element 80, the second light emitting guard 86, and the second light receiving guard element 90 may be omitted. In this case, a first light beam would be emitted from the first light emitting element 70, reflected by a first surface of a banknote 20 in the banknote passageway 22, and received by the first light receiving element 78. Similarly, a second light beam would be emitted from the second light emitting element 84, reflected by a second surface of the banknote 20 in the banknote passageway 22, and received by the second light receiving element 88.

The control unit 92 is now explained in reference to FIG. 2. The control unit includes a first switching unit 96, a second switching unit 98, a first analog-to-digital (AD) converter 100, a second AD converter 102, and a reading controlling unit 104. The first switching unit 96 controls the output of the first emitting element 70, also the second switching unit 98 controls the output of the second emitting element 84. The first AD converter 100 converts an analog signal from the first light receiving element 78 to a digital signal, and outputs the digital signal to a microprocessor (μP) 94. The second AD converter 102 converts an analog signal from the second light receiving element 88 to a digital signal, and outputs the digital signal to the microprocessor 94.

The reading controlling unit 104 controls the output of both the first AD converter 100 and the second AD converter 102 under the control of the microprocessor 94. Alternatively, the reading controlling unit 104 can be implemented to control outputs to the first AD converter 100 and the second AD converter 102 based on a programmed set of instructions executing on the microprocessor 94. The microprocessor 94 computes a banknote valid signal 120 for the banknote 20 based on receiving and processing data from the first AD converter 100 and the second AD converter 102. The starting sensor 28 outputs a banknote detecting signal to the microprocessor 94. The microprocessor 94 controls the motor of the banknote transporting unit 34 based on the banknote detecting signal.

Figure 3:
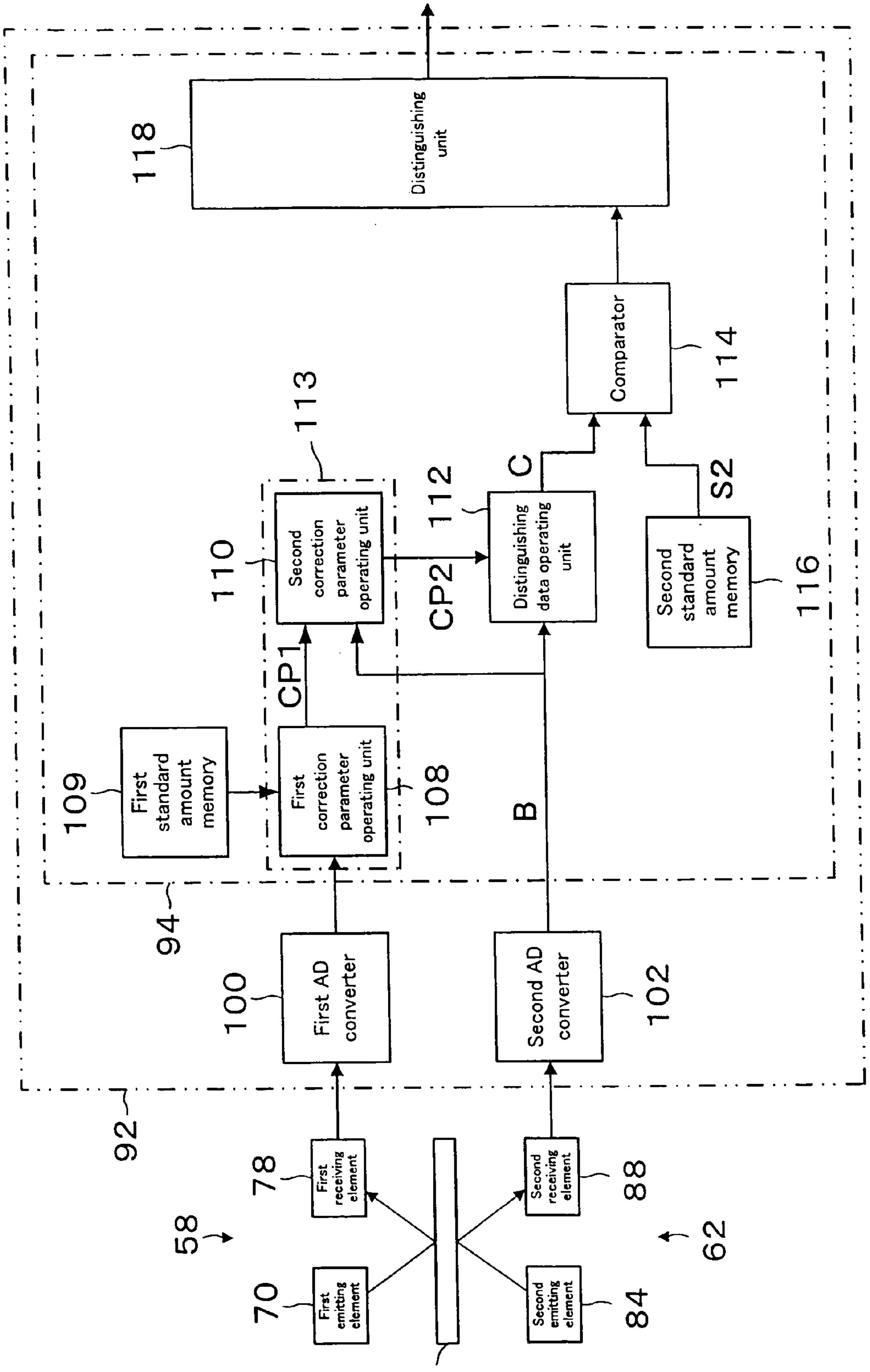
FIG. 3 is a block diagram of the control unit showing the connection with functional representations of the reflecting sensor units and a high-level block diagram showing the computational blocks for the banknote validation in accordance with an embodiment of the present invention.

In reference to FIG. 3, a block diagram of the control unit 92 showing the connection with functional representations of the reflecting sensor units and a high-level block diagram showing the computational blocks for the banknote validation system is shown and explained. The function of the microprocessor 94 is largely explained referring to the block diagram. For illustrative purposes, the obverse side of the banknote 20 is considered to be the side facing the first reflecting sensor unit 58, while the reverse side of the banknote 20 is considered to be the side of the banknote 20 facing second reflecting sensor unit 62.

The output of the first AD converter 100 is provided to the first correction parameter operating unit 108. The output of the first AD converter 100 corresponds to the amount of light received by the first light receiving element 78 and is compared to a reference amount or level stored in the memory of the microprocessor 94, or a memory operatively connected to the microprocessor 94. The memory in this case can be Random Access Memory (RAM) permitting writeable and readable data storage. In this way, the displacement amount of the banknote 20 within the banknote passageway 22 can be calculated in the first correction parameter operating unit 108.

For example, when the banknote 20 is displaced to a position H, as shown by the dotted line in FIG. 4(A), then the banknote 20 is moved nearer to the first reflecting sensor unit 58 and farther away from the second reflecting sensor unit 62. In this case, the output of the first light receiving element 78 at a first data sampling point RT1 is larger than the expected amount S. A biasing amount D1 at the standard position M is computed based on outputting the standard line SR1 as shown in FIG. 4(C).

In the first reflecting sensor unit 58, the output of the first light receiving element 78 is linear in proportion to the distance between the banknote 20, the first emitting element 70, and the first light receiving element 78. The difference is calculated between the intersection point SR which is between the output of the first AD converter 100 and the output standard line SR1 and the intersection point SR which is between the standard amount S and an output standard line SR1. Accordingly, the biasing amount D1 that is between the standard position M and a displaced position H can be calculated.

The second reflecting sensor unit 62 and the banknote 20 are displaced according to the biasing amount D1 from the standard position M. Therefore the first correction parameter CP1 is asserted from the first correction parameter operating unit 108 to a second correction parameter operating unit 110. The first correction parameter CP1 is the difference between the point BR on the biasing amount D1 between the output standard line SR1 and the standard position M and the point SR. The first correction parameter CP1 corrects the output of the second reflecting sensor unit 62 which receives reflected light from the reverse side of the banknote 20.

A correction parameter CP2 for correcting the output of the second reflecting sensor unit 62 is calculated based on the first correction parameter CP1 from the first parameter operating unit 108 and the outputting standard line B1 in the second correction parameter operating unit 110. The correction parameter CP2 is then asserted to the distinguishing data operating unit 112. The correction parameter CP2 corrects according to an amount at an intersection point SB which approaches at the biasing amount D1 from an intersection point BB that corresponds to output standard line B1 and an intersection point BR.

A correction parameter for correcting the output of second AD converter 102 which is an output of the received amount of the second photo element 88 to the value at the standard position M is asserted. The second correction parameter operating unit 110 calculates the second correction parameter CP2 for correcting from the received light amount of the second reflecting sensor unit 62 to a light receiving amount at the standard position and asserts the second correction parameter CP2 to the distinguishing data operating unit 112.

Figure 4:
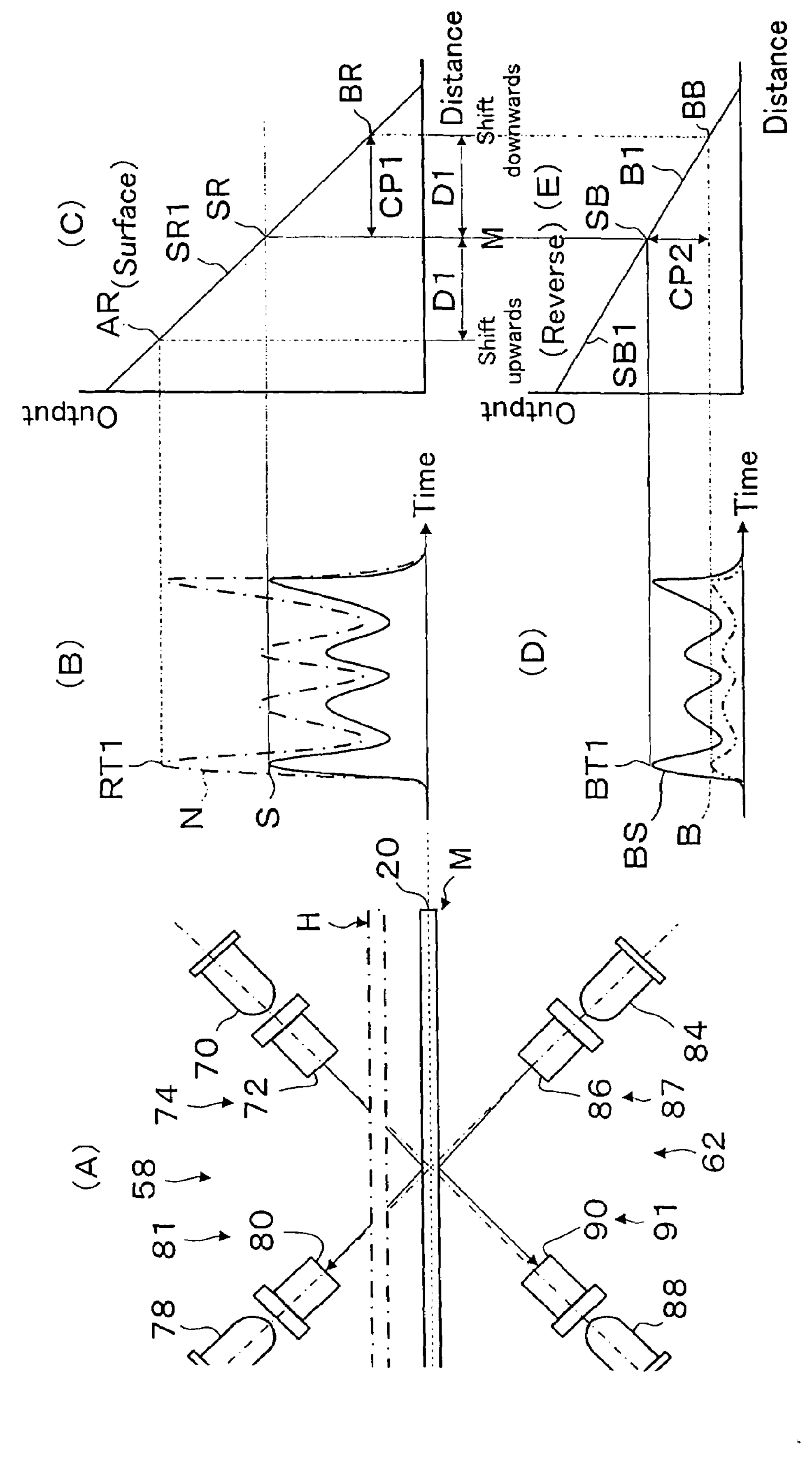
FIGS. 4(A)–4(E) show interrelated signals when a portion of the received banknote at the reflecting point is deflected from a position between the reflecting sensor units in accordance with an embodiment of the present invention.

In reference to FIG. 4, the distance between the second reflecting sensor unit 62 and the banknote 20 is displaced a biasing amount D1 according to the standard. The output of the second light receiving element 88, as the output of the second AD converter 102, is smaller as shown by the dotted line B in FIG. 4(D). An output BS is shown by the solid line and is larger than the dotted line B. Normally, the output B of the second AD converter 102 corresponds to the output BS at the standard position M. The second correction parameter CP2, which approaches the biasing amount D1, is calculated based on an output standard line SB1, and the second correction parameter CP2 is outputted to the distinguishing data operating unit 112.

The second reflecting sensor unit 62 outputs a signal at the sampling point BT1, immediately outputting from the first reflecting sensor unit 58 at the sampling point RT1. The outputting timing first reflecting sensor unit 58 and the outputting timing of the second reflecting sensor unit 62 are offset in time. However the timing offset is only for a short time, and is considered negligible. Thus, the first reflecting sensor unit 58 and the second reflecting sensor unit 62 are considered to examine the same region of the banknote 20, at the same displacement between the first reflecting sensor unit 58 and the second reflecting sensor unit 62, as the banknote 20 is proceeding along the banknote passageway 22.

Therefore the second correction parameter CP2 for correcting the output of the second light receiving element 88 to a sampling data at the standard position is asserted from the second correction parameter operating unit 110 based on the biasing amount D1. The first correction parameter operating unit 108 and the second correction parameter operating unit 110 together define the correction parameter operating unit 113. The detecting amount which corresponds at the standard position is calculated based on the received data from the second correction parameter CP2 and the second AD converter 102 in the distinguishing unit 112 and is asserted to the comparing unit 114 as a correction detecting amount C.

The correction detecting amount C is compared to the second standard amount S2 from a second standard memory 116 in a comparing unit 114. When the correction detecting amount C is within the range of the second standard amount, a valid point is asserted to the distinguishing unit 118. When the correction detecting amount C is not within the range of the second standard amount, an invalid point is asserted to the distinguishing unit 118. The distinguishing unit 118 sums up the valid points and the invalid points for each of the receiving points for a banknote 20, and compares the sum to an expected, standard amount. Based on this comparison, the distinguishing unit 118 outputs either a valid or an invalid signal. In this case, the decision reflects a majority of the valid or invalid indications and produces a majority validity decision.

Figure 5:
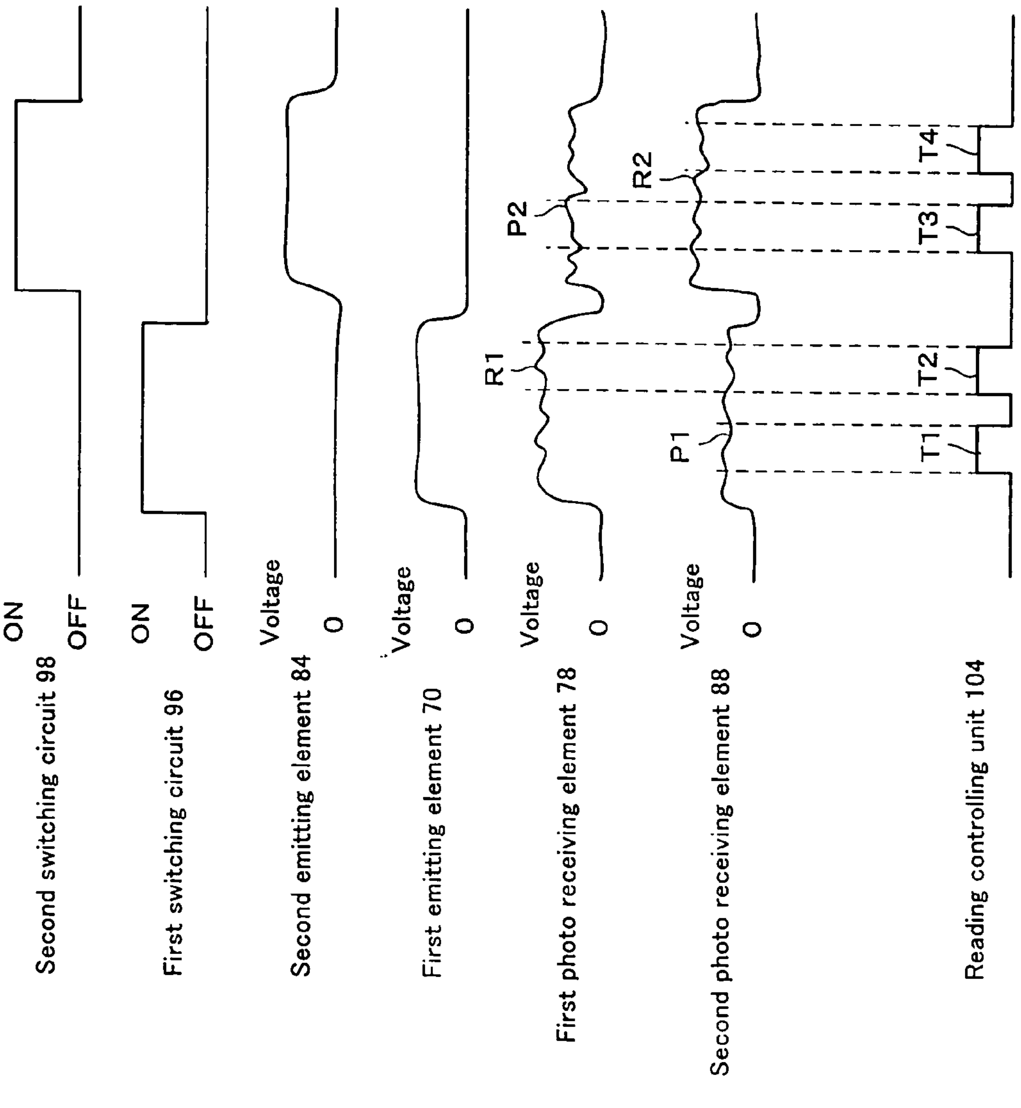
FIG. 5 shows example signals during activation of the reflecting sensor units in accordance with an embodiment of the present invention.

In reference to FIG. 5, example signals during activation of the reflecting sensor units are shown and explained. A banknote 20 is inserted into the banknote slot 24 along the lower guiding surface 16. When the leading end of the banknote 20 traveling in the forward processing direction along the banknote passageway 22 blocks the light between the projecting receiving element 30 and the associated reflecting member 32, the microprocessor 94 activates a motor (not shown) to operate the transporting unit 34. The inserted banknote 20 is held between the pulley 42 and the belt 52 and is then transported to the right, as shown in FIG. 1.

The first switching unit 96 and the second switching unit 98 are alternately switched in a short time by a control signal from the microprocessor 94 based on the banknote detecting signal from the starting sensor 28 until the banknote 20 is passed by the banknote detecting apparatus 54. In this way, the first emitting element 70 is activated and emits light at a predetermined time. After the first light emitting element 70 is activated, the second light emitting element 84 activated at a predetermined time. This alternating process is repeated at a predetermined interval during the passing of the banknote 20 adjacent to the first reflecting sensor unit 58 and the second reflecting sensor unit 62.

Light from the first light emitting element 70 crosses the banknote passageway 22 and illuminates the second light receiving element 88 which together form the first aligned sensor pair 56. The light received by the first light receiving element 88 is converted to a signal P1 corresponding to the amount of light received by the second light receiving element 88. The amount of received light by the second light receiving element 88 is usually a small amount, because it is largely attenuated by passing through the banknote 20. At the same time, the light beam from the first emitting element 70 is reflected by the obverse side of the banknote 20, and is received by first light receiving element 78 that forms the first reflecting sensor unit 58. The received light is converted to a signal R1 corresponding to the amount of received light from the reflected beam.

The amount of reflected light is usually greater than the amount of the passed light so the signal R1 is usually greater than the signal P1. The difference between the signal levels R1 and P1 depends on the position of the banknote 20 between the first reflecting sensor unit 58 and the second reflecting sensor unit 62. When the banknote 20 is displaced towards the first reflecting sensor unit 58 as shown in position H, the difference between the signal levels R1 and P1 is greater than when the banknote 20 is position at the standard position M.

Similarly, the light from the second emitting element 84 crosses the banknote passageway 22, and is received by the first light receiving element 78 which forms a second aligned sensor pair 60, and is converted to a signal P2 corresponding to the amount of received light from the second light emitting element 84. At the same time, the light from the second emitting element 84 is reflected by the reverse side of the banknote 20, and is received by the second light receiving element 88 which forms the second reflecting sensor unit 62. The second light receiving element 88 converts the received light amount to a signal R2. Analog signals R1 and P2 from the first light receiving element 78 are converted into digital signals by the first AD converter 100, and are outputted to the microprocessor 94. Analog signals P1 and R2 of the second light receiving element 88 are converted to digital signals by the second AD converter 102, and are asserted to the microprocessor 94.

When the first light emitting element 70 is activated, the microprocessor 94 receives the digital signal DP1 corresponding to the analog signal P1 based on a timing signal T1 asserted by the reading control unit 104. The signal P1 is the output of the first aligned sensor pair 56 and provides a signal based on a third light beam from the first light emitting element 70, passing through a region of the banknote 20, and to the second light receiving element 88. While the first light emitting element 70 is activated, the microprocessor 94 receives the digital signal DR1 corresponding to the analog signal R1 based on a timing signal T2 asserted by the reading control unit 104. The signal R1 is the output of the first reflecting sensor unit 58 and provides a signal based on a first light beam from the first light emitting element 70, reflected by the obverse side of the banknote 20, and to the first light receiving element 78. The first segment of the third light beam is the same as the first light beam from the first light emitting element 70 to the region of the banknote 20 where the first light beam strikes the banknote 20.

When the second light emitting element 84 is activated, the microprocessor 94 receives the digital signal DP2 corresponding to the analog signal P2 based on a timing signal T3 asserted by the reading control unit 104. The signal P2 is the output of the second aligned sensor pair 60 and provides a signal based on a fourth light beam from the second light emitting element 84, passing through a region of the banknote 20, and to the first light receiving element 78. While the second light emitting element 84 is activated, the microprocessor 94 receives the digital signal DR2 corresponding to the analog signal R2 based on a timing signal T4 asserted by the reading control unit 104. The signal R2 is the output of the second reflecting sensor unit 88 and provides a signal based on a second light beam from the second light emitting element 84, reflected by the reverse side of the banknote 20, and to the second light receiving element 88. The first segment of the fourth light beam is the same as the second light beam from the second light emitting element 84 to the region of the banknote 20 where the second light beam strikes the banknote 20.

The timing (delay and period) of the control signals (T1, T2, T3, and T4) for capturing the output of the first AD converter 100 and the second AD convert 102 is determined in reference to the length of the banknote 20 and the transporting speed of the transporting unit 34. The validity of the banknote 20 is determined by the distinguishing unit 118 and is based on the valid points received. If a sufficient number of valid points are detected, a banknote valid signal 120 is asserted indicating the validity of the banknote 20.

The biasing amount D1 is calculated based on the received data of the first reflecting sensor unit 58 at the timing signal T2 by the first correction parameter unit 108. The output CP1 of the first correction parameter operating unit 108 is applied to output the standard line SR1, and the correction parameter CP2 for the output of the second light receiving element 88 of the second reflecting sensor unit 62 corresponding to the passing position of the banknote 20 is asserted by the second correction parameter operating unit 110.

The output of the second AD converter 102 of the second reflecting sensor unit 62 at the next sampling point is corrected by the correction parameter CP2 second correction parameter operating unit 110 in the distinguishing data operating unit 112. The corrected data is compared to the standard amount S2 of the second standard amount memory 116 by the comparator 114. The comparator asserts either a valid point or an invalid point to the distinguishing unit 118 that outputs a valid signal 120 based on the sum of the valid points and the invalid points.

If the number of valid points is greater than the number of invalid points the received banknote is determined valid and the banknote valid signal 120 is asserted. Alternatively, a threshold value can be used to raise the level of certainty by requiring a super majority of validity points versus invalidity points before a banknote 20 can be declared to be valid. The first emitting element 70 is common to both the first aligned sensor pair 56 and the first reflecting sensor unit 58. Similarly, the second light emitting element 84 is common to both the second aligned sensor pair 60 and the second reflecting sensor unit 62. By sharing these elements in common, the number of light emitting and light receiving elements is reduced and results in a more compact configuration as well as a lower cost to manufacture and test. Alternatively, independent elements may be used and not shared between the first reflecting sensor unit 58 and the second reflecting sensor unit 62.

Even though the output of the second reflecting sensor unit 62 is described as corrected due to the position of the banknote 20, in an alternative embodiment the output of first reflecting sensor unit 58 can be corrected based on the output of second reflecting sensor 62. Further, a sensor for correcting the correction parameter can be located on one side of the banknote 20 so that the output of the reflecting sensor is corrected.

When the banknote 20 is wrinkled and has a wavy surface, the detecting data is corrected to a data at the standard position as described above. Afterwards, the corrected detecting data is compared to the standard detecting data in this present invention. As a result, determining the validity of the banknote 20 is not affected by wrinkles in the banknote 20. So, when the banknote position is displaced from the standard position, the sampled data of the reflecting sensor is corrected to the data at the standard position, and may be compared to the standard amount. When the standard range is narrow, the validity of the banknote is correct.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A banknote validator apparatus, comprising:

a first reflecting sensor unit adjacent to a first side of a banknote passageway for receiving a banknote, the first reflecting sensor unit including a first light projecting section and a first light receiving section for projecting a first light beam and receiving a predetermined portion of the first light beam reflected from the received banknote, the first light receiving section outputting a first light receiving section signal;

a second reflecting sensor unit adjacent to the first reflecting sensor unit, the second reflecting sensor unit including a second light projecting section and a second light receiving section for projecting a second light beam and receiving a predetermined portion of the second light beam reflected from the received banknote, the second light receiving section outputting a second light receiving section signal;

a first correction parameter operating unit for receiving the first light receiving section signal and generating a correction parameter signal referring to a distance between the banknote and the second reflecting sensor unit; and a distinguishing unit for receiving the second light receiving section signal and the first correction parameter signal and distinguishing the validity of the received banknote.

2. The apparatus of claim 1, wherein the second reflecting sensor unit is disposed on a second side of the banknote passageway opposite from the first reflecting sensor unit.

3. The apparatus of claim 2, further comprising:

a second correction parameter operating unit for generating a correction parameter signal referring to a distance between the banknote and the second reflecting sensor unit; and a comparator unit for distinguishing the validity of the banknote based on the second light receiving section signal and the second correction parameter signal.

4. The apparatus of claim 2, wherein the first light projecting section is disposed on a first axis on the first side of the banknote passageway and the second light receiving section is disposed on the first axis on the second side of the banknote passageway opposite the first side, the first axis crossing the banknote passageway, and wherein the second light projecting section is disposed on a second axis on the second side of the banknote passageway and the first light receiving section is disposed on the second axis on the first side of the banknote passageway, the second axis crossing the banknote passageway and crossing with the first axis.

5. The apparatus of claim 4, further comprising:

a read controlling unit for alternately controlling the reading of one of the first light receiving section signal and the second light receiving section signal, the first projecting section emitting the first light beam and the second projecting section emitting the second light beam at mutually exclusive periods of time.

6. A banknote validator apparatus, comprising:

a first reflecting sensor unit adjacent to a first side of a banknote passageway, the banknote passageway for receiving a banknote having a first side and a second side, the first reflecting sensor unit including a first photo projecting section for receiving a first photo projecting activation signal and projecting a first light beam, the first reflecting sensor unit including a first light receiving section for receiving a predetermined portion of the first light beam reflected from a predetermined first location on the first side of the received banknote and producing a first light receiving section signal;

a second reflecting sensor unit adjacent to the first reflecting sensor unit, the second reflecting sensor unit including a second photo projecting section for receiving a second photo projecting activation signal and projecting a second light beam, the second reflecting sensor unit including a second light receiving section for receiving a predetermined portion of the second light beam reflected from a predetermined second location on the second side of the received banknote opposite the predetermined first location and producing a second light receiving section signal; and a control unit for receiving the first light receiving section signal and the second light receiving section signal, the control unit for producing the first activation signal and the second activation signal, the control unit for evaluating the first light receiving section signal to determine a distance factor for use in evaluating the second light receiving section signal for use in determining the validity of the received banknote.

7. The apparatus of claim 6, wherein the first light projecting section is disposed on a first axis on the first side of the banknote passageway and the second light receiving section is disposed on the first axis on a second side of the banknote passageway opposite the first side, the first axis crossing the banknote passageway, and wherein the second light projecting section is disposed on the second axis on the second side of the banknote passageway and the first light receiving section is disposed on the second axis on the first side of the banknote passageway, the second axis crossing the banknote passageway and crossing with the first axis.

8. The apparatus of claim 7, wherein the first axis and the second axis cross each other at a midpoint of the banknote passageway.

9. The apparatus of claim 7, wherein the first axis and the second axis each cross the banknote passageway at an obtuse angle.

10. A method of determining the validity of a received banknote, comprising the steps of:

emitting a first light beam from a first light projection section upon a predetermined first location of the received banknote;

reflecting a predetermined portion of the first light beam by the received banknote at the predetermined first location to a first light receiving section;

producing a first light receiving section signal;

capturing a first side sample of the first light receiving section signal in a control unit, the first side sample being a representation of the first light receiving section signal at a predetermined first sampling time;

emitting a second light beam from a second projection section upon a predetermined second location of the received banknote opposite the first location;

reflecting a predetermined portion of the second light beam by the received banknote at the predetermined second location to a second light receiving section;

producing a second light receiving section signal;

capturing a second side sample of the second light receiving section signal in the control unit, the second side sample being a representation of the second light receiving section signal at a predetermined second sampling time;

evaluating the first side sample in comparison with a history of first side samples to produce a first correction value;

evaluating the second side sample and the first correction value to produce a second correction value;

evaluating the second side sample and the second correction value to produce a correction detecting value; and comparing the correction detecting value with a history correction detecting values to produce a validity decision, the validity decision being one of true or false, wherein true indicates a valid banknote and false indicates an invalid banknote.

11. The method of claim 10, further comprising the steps of:

summing up a plurality of validity decisions computed for a plurality of locations on the received banknote to determine a majority validity decision, the majority validity decision being one of true and false, wherein true indicates a majority of the plurality of validity decisions were true and false indicates a majority of the plurality of validity decisions were false; and outputting the majority validity decision as a banknote valid signal when the majority validity decision is true.

* * * * *